United States Patent
Garcia et al.

(10) Patent No.: US 12,508,966 B2
(45) Date of Patent: Dec. 30, 2025

(54) SYSTEM AND METHOD FOR AUTO-TILTING HEADREST FOR VEHICLE AUDIO EXPERIENCE

(71) Applicant: Harman International Industries, Incorporated, Stamford, CT (US)

(72) Inventors: Christian Manuel Garcia, Winnetka, CA (US); Alfredo Fernandez Franco, Sherman Oaks, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 162 days.

(21) Appl. No.: 18/631,894

(22) Filed: Apr. 10, 2024

(65) Prior Publication Data

US 2025/0319803 A1 Oct. 16, 2025

(51) Int. Cl.
- B60N 2/853 (2018.01)
- B60N 2/80 (2018.01)
- B60N 2/862 (2018.01)
- B60N 2/879 (2018.01)

(52) U.S. Cl.
CPC ............ B60N 2/853 (2018.02); B60N 2/862 (2018.02); B60N 2/879 (2018.02); B60N 2002/899 (2018.02); B60N 2210/00 (2023.08)

(58) Field of Classification Search
CPC ........ B60N 2/853; B60N 2/862; B60N 2/879; B60N 2002/899; B60N 2210/00
See application file for complete search history.

(56) References Cited

U.S. PATENT DOCUMENTS

| | | | |
|---|---|---|---|
| 7,145,263 B2 | 12/2006 | Nathan et al. | |
| 7,640,090 B2 * | 12/2009 | Uchida | B60N 2/888 297/216.12 |
| 10,562,426 B2 * | 2/2020 | Scott | B60N 2/829 |
| 11,148,568 B2 * | 10/2021 | Hong | B60N 2/806 |
| 2011/0264332 A1 | 10/2011 | Yamaguchi et al. | |
| 2023/0278467 A1 * | 9/2023 | Kao | B60N 2/0244 701/36 |

OTHER PUBLICATIONS

Extended European Search Report for Application No. 25169651.4, dated Aug. 28, 2025, 7 pages.

* cited by examiner

*Primary Examiner* — Joshua J Michener
*Assistant Examiner* — Michael B. Kreiner
(74) *Attorney, Agent, or Firm* — Brooks Kushman P.C.

(57) ABSTRACT

In at least one embodiment, a seat assembly is provided. The seatback receives an occupant in a vehicle. A headrest is coupled to the seatback. The headrest includes a motor, at least one sensor, and at least one controller. The motor rotates the headrest to orient an occupant's head relative to one or more loudspeakers positioned in the vehicle. The at least one sensor is configured to detect a location of the headrest. The at least one controller is programmed to control the motor to move the headrest to a predetermined location relative to the one or more loudspeakers positioned in the vehicle to optimize a listening experience for the occupant in the vehicle.

18 Claims, 4 Drawing Sheets

SYSTEM AND METHOD FOR AUTO-TILTING HEADREST FOR VEHICLE AUDIO EXPERIENCE

TECHNICAL FIELD

Aspects disclosed herein generally related to a system and method for providing an auto-tilting headrest. The disclosed system and method may provide for an auto-tiling headrest for a vehicle audio experience for an occupant positioned in a vehicle. These aspects and others will be discussed in more detail below.

BACKGROUND

Currently, headrests in today's vehicles have to be tilted manually to adjust accordingly to a height and posture of a vehicle occupant. In some cases, the operation of tilting the headrest may be difficult, awkward, or even time consuming when attempts are made to make the overall position of the headrest comfortable for a driver or passenger. Similarly, the position of the headrest may adversely impact a listening experience for an occupant in the vehicle.

SUMMARY

In at least one embodiment, a seat assembly is provided. The seatback receives an occupant in a vehicle. A headrest is coupled to the seatback. The headrest includes a motor, at least one sensor, and at least one controller. The motor rotates the headrest to orient an occupant's head relative to one or more loudspeakers positioned in the vehicle. The at least one sensor is configured to detect a location of the headrest. The at least one controller is programmed to control the motor to move the headrest to a predetermined location relative to the one or more loudspeakers positioned in the vehicle to optimize a listening experience for the occupant in the vehicle.

In at least one embodiment, a seat assembly is provided. The seatback receives an occupant in a vehicle. A headrest is coupled to the seatback. A motor rotates the headrest to orient an occupant's head relative to one or more loudspeakers positioned in the vehicle. At least one sensor is configured to detect a location of the headrest. At least one controller is programmed to control the motor to move the headrest to a predetermined location relative to the one or more loudspeakers positioned in the vehicle to optimize a listening experience for the occupant in the vehicle.

In at least another embodiment, a method for moving a headrest in a vehicle is provided. The method includes rotating, via a motor, the headrest to orient an occupant's head relative to one or more loudspeakers positioned in the vehicle and detecting a location of the headrest. The method further includes controlling the motor, via at least one controller, to move the headrest to a predetermined location relative to the one or more loudspeakers positioned in the vehicle to optimize a listening experience for the occupant in the vehicle.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

One function of a vehicle headrest (or restraint) is to support a head and neck of a vehicle occupant during moments of vehicle impact. For example, such vehicle headrests limit the rear movement of the vehicle occupant's head relative to the rest of their body during a vehicle collision. This is performed to prevent injury to the spine during a vehicle collision. As is known, the vehicle occupant can adjust the position of the headrest relative to his/her head to ensure that the head is positioned on the headrest comfortably. However, the adjustment of the headrest is generally manual and may create a situation in which the head is no longer positioned to enable the user to experience audio that is being played back by a loudspeaker system in the vehicle at an optimum listening experience. Similarly, the vehicle headrest is generally coupled to a seatback. The seatback may recline or move to different positions based on a desired position that the occupant desires which may also affect the position of the headrest relative to the occupant's head.

Vehicle headrest development is now taking into account spatial audio in which the headrest is arranged not only to properly mitigate injury of the occupant's spine during a collision but ensures a maximum listening experience by positioning the occupant's head at an optimal angle to receive a sound beam being transmitted from loudspeakers in the vehicle. Thus, in this regard, it may be desirable to automatically control a tilt of the headrest such that the headrest is, for example, positioned parallel with loudspeakers positioned in an instrument panel in moments in which the occupant reclines the seatback. Conversely, it may be desirable to automatically control the tilt of the headrest such that the headrest is at least parallel to the direction of the sound beam that is being transmitted from the loudspeakers positioned in the instrument panel. These aspects and others will be discussed in more detail below.

Figure 1:
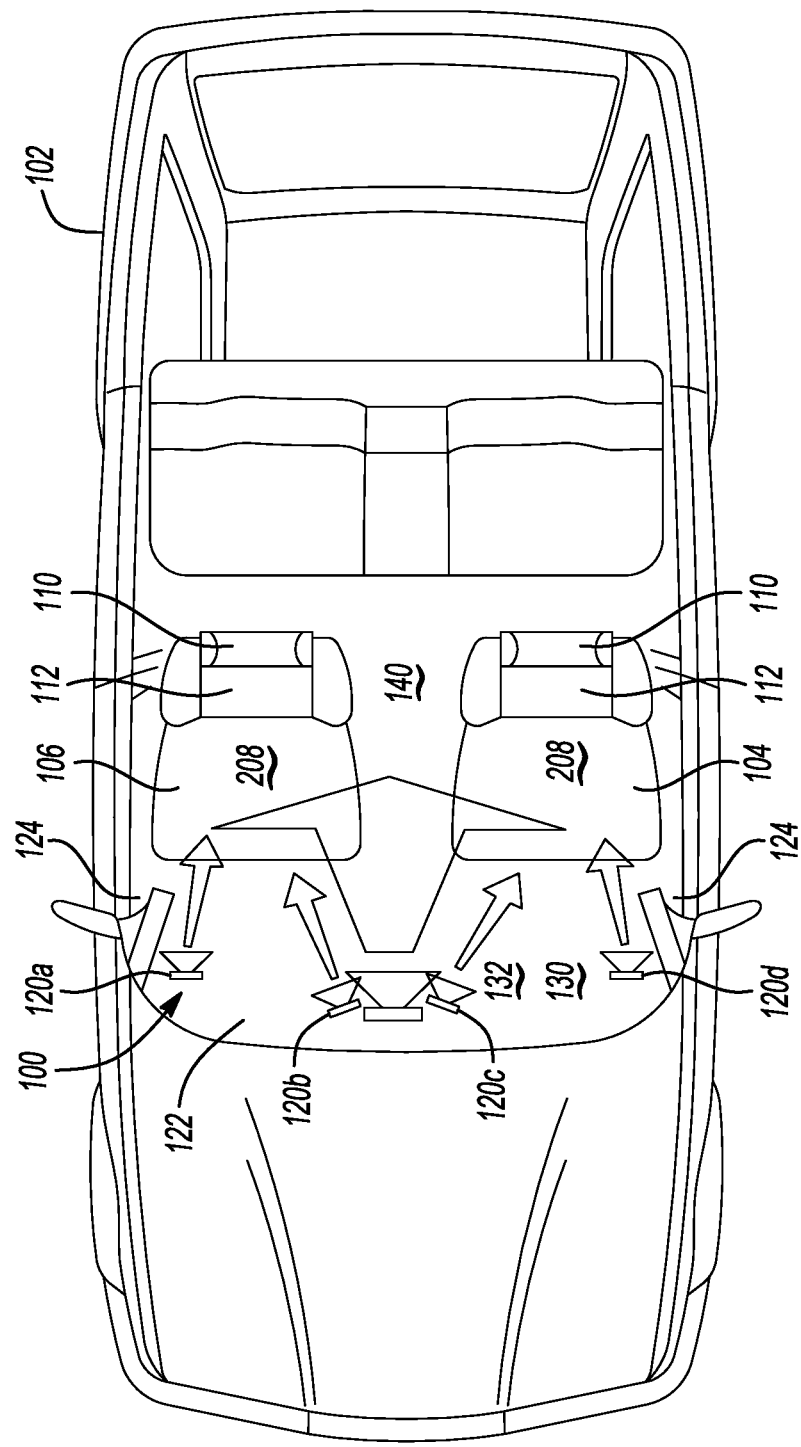
FIG. 1 generally depicts a loudspeaker arrangement (or system) as positioned within a vehicle in accordance with one embodiment.

FIG. 1 generally depicts a loudspeaker arrangement 100 (or system 100) as positioned within a vehicle 102 in accordance with one embodiment. FIG. 1 generally illustrates a top view of the vehicle 102. The vehicle 102 includes a front left seat 104 and a front right seat 106. In one example, the front left seat 104 may correspond to a driver's seat and the front right seat 106 may correspond to a passenger seat. Each of the seats 104 and 106 generally include a headrest 110 and a seatback 112. As will be discussed in more detail below, the headrest 110 generally tilts or pivots, in the vehicle 102 relative to the seatback 112.

The loudspeaker arrangement 100 generally includes a plurality of loudspeakers 120a-120b (or "120") positioned on a dashboard or instrument panel 122 of the vehicle 102. It is recognized that any one or more of the loudspeakers 120 may be positioned on respective front pillars (or "A" pillars) 124 of the vehicle 102. An audio controller 130 is operably coupled to the loudspeakers 120 and transmits an audio output signal to the various loudspeakers 120 in the vehicle 102. In turn, the loudspeakers 120 transmit an audible version of the audio output signal within, or into, an interior cabin 140 (or the listening environment) of the vehicle 102. The plurality of loudspeakers 120 may include any number of loudspeaker types such as mid-range loudspeaker(s) and tweeter(s). It is also contemplated that the loudspeakers 120 may also include woofers or sub-woofers. The particular type of loudspeakers utilized within the loudspeaker arrangement 100 may vary based on the desired criteria of a particular implementation.

A mid-range-based loudspeaker may radiate sound at frequencies of, for example, between 250 to 2000 Hz. In addition, some mid-range loudspeakers may even radiate sound at frequencies of between 250 to 3000 Hz. It is recognized that any other suitable frequency ranges are generally possible, depending on the specific application and system. The loudspeaker 120 (or tweeter) 120 (e.g., high-frequency loudspeaker) radiates sound at a frequency that is higher than the frequency radiated by the mid-range loudspeaker, for example, between 2 to 20 kHz. It is recognized that the tweeter 120 may also radiate frequencies of above 20 kHz. In general, arrangements including tweeters that radiate frequencies of above 20 kHz may be referred to as high resolution audio systems.

In general, any one or more of the loudspeakers 120 may be directional or non-directional. For any loudspeaker 120 that is directional, such a loudspeaker transmits the audio in a straight beam of sound. For any loudspeaker 120 that is non-directional, such a loudspeaker transmits the audio with a controlled dispersion. The controlled dispersion may be achieved in any suitable way, e.g., by using acoustical lenses, or by providing several mid-range or full-range loudspeakers in an array configuration (e.g., several mid-range or full-range loudspeakers arranged in a line array). Another possibility to control the directivity of sound energy emitted by the plurality of loudspeakers 120 is configure the audio controller 130 to perform digital signal processing (DSP) by controlling filters, equalizers and delays. For example, the audio controller 130 may perform digital signal processing by utilizing finite impulse response (FIR) filters. It is recognized that the loudspeakers 120 may be combined to transmit the audio to both the seat 104 and the seat 106 in essentially equal parts. In another embodiment, various loudspeakers 120 may be arranged to transmit the audio primarily to the seat 104 and not to the seat 106. Similarly, various loudspeakers 120 may be arranged to transmit the audio primarily to the seat 106 and not to the seat 104.

In general, audio engineers may orientate the loudspeakers 120 positioned within the dashboard 122 and/or the A pillars 124 at one or more predetermined angles thereof such that the audio transmitted to the driver in the seat 104 and the passenger in the seat 106 is heard at optimum levels to improve the listening experience for the driver and/or the passenger. The determination in terms of positioning the loudspeakers 120 at optimal or predetermined angles on the dashboard 122 and/or the A pillars 124 may be performed during a tuning phase that occurs before the vehicle 102 goes into mass production. Generally, with respect to the positioning of the occupant's head on the headrest 110, it is desirable to ensure that the occupant's head remain orientated in a parallel manner, or on the same plane with respect to the sound beams emitted from one or more of the loudspeakers 120. In this regard, it may be advantageous for the headrest 110 to remain perpendicular to a gravity vector 170 (see FIGS. 2 and 4) that extends from a roof 173 of the vehicle 102 to a floor 175 of the vehicle 102 to ensure that the occupant's head remains orientated in the parallel manner with respect to the sound beams emitted from the loudspeakers 120. This condition may generally ensure that the occupant experiences an optimal listening experience.

A user interface 132 may be operably coupled to the audio controller 130. Each seat 104, 106 may include and at least one seat controller 208 ("the seat controller 208"). The seat controller 208 may control movement of the headrest 110 and/or the seatback 112. The seat controller 208 may be operably coupled to the user interface 132 and/or to the audio controller 130. In general, the user interface 132 may receive signals indicative of the position of the headrest 110. In the event the user interface receives a signal from the seat 104, 106 indicating that the headrest 110 is not positioned within a predetermined angle of the gravity vector 170, then the user interface 132 may provide a visual and/or audible warning to the occupant to notify the occupant that the head of the occupant may not be orientated in a position that enables the occupant to listen to the audio within the vehicle 102 at an optimal listening experience. Similarly, the occupant may also select via one or more prompts, selections, switches on the user interface 132 to move their respective headrest 110 to the optimal listening experience. In this regard, the user interface 132 provides a control signal to the seat controller 208 over a bi-directional communication bus (e.g., via Controller Area Network (CAN). In turn, the seat controller 208 automatically moves the headrest 110 to the location that provides the optimal listening position for the occupant. It is recognized that the user interface 132 may transmit a signal over the bi-directional communication bus to the audio controller 130. These aspects will be discussed in more detail below.

Figure 2:
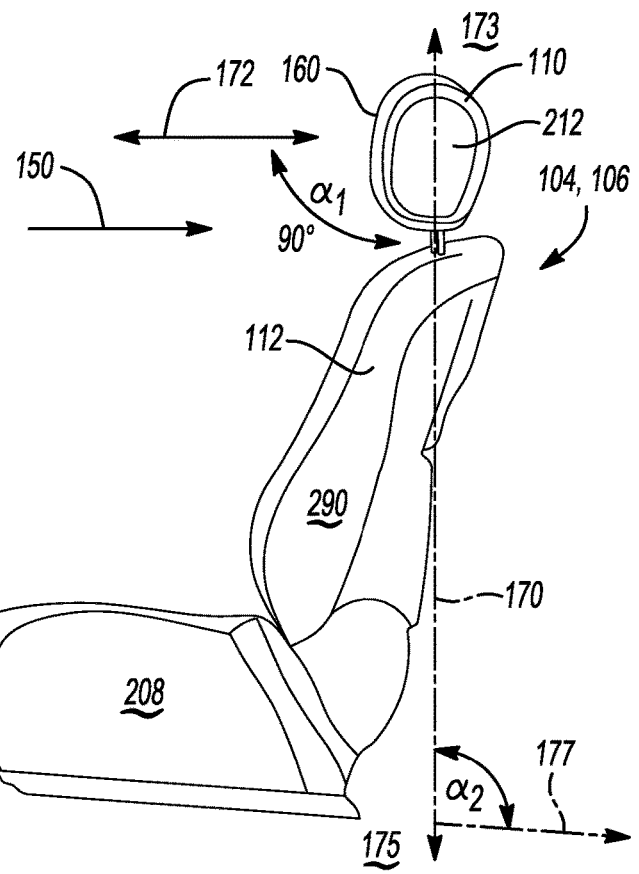
FIG. 2 depicts a side view of a seat relative to the speaker arrangement in a vehicle in accordance with one embodiment.
Figure 2:
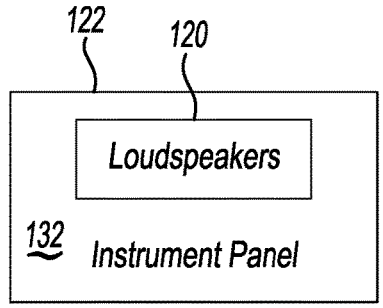

FIG. 2 depicts a side view of the seat 104, 106 relative to the speaker arrangement 100 in the vehicle 102 in accordance with one embodiment. The loudspeakers 120 generally transmit audio (or a sound beam) along a first axis 150 that extends longitudinally across the vehicle 102 to the driver in the seat 104 and/or to the passenger in the seat 106. The headrest 110 generally provides a front face 160 that is orientated toward the sound beam that extends in an opposite direction with respect to the first axis 150. In this regard, a second axis 172 is shown to illustrate that the headrest 110 is controlled to remain parallel, or to be on the same plane, with the sound beam that is transmitted along the first axis 150. Thus, the second axis 172 may extend in a parallel relationship, but in an opposite direction with respect to the first axis 150 to ensure that the occupant's head as positioned on the headrest 110 experiences an optimal listening experience. Thus, it may be advantageous for the headrest 110 (i.e., the front face 160 of the headrest 110) to form a first angle ($\alpha_1$), for example, such as a generally 90-degree angle between the second axis 172 that extends from the front face 160 and the gravity vector 170 to ensure that the occupant experiences an optimal listening experience. Alternatively, or additionally, it may be advantageous for the headrest 110 to form a second angle ($\alpha_2$), for example, between the angular position of the headrest 110 and a third axis 177 that extends, in parallel, along the floor 175 of the vehicle 102 to ensure that the occupant experiences an optimal listening experience. The second angle may be a generally 90-degree angle between the gravity vector 170 and the third axis 177. Either the first angle formed between the second axis 172 and the gravity vector 170 and/or the second angle formed between the third axis 177 and the gravity vector 170 may be used by audio engineers to determine a predetermined location (e.g., angular position) of the headrest 110 to provide the optimal listening experience.

The headrest includes at least one sensor 212 ("the sensor 212") positioned therein that is operably coupled to the seat controller 208. The sensor 212 may be implemented as an accelerometer to detect a tilt or inclination of the headrest 110 and/or the seatback 112 (e.g., as the seatback 112 moves pivots in fore and aft directions, or reclines, etc., the tilt of the headrest 110 also moves). For example, in the event the headrest 110 tilts or rotates causing the second axis 172 and/or the third axis 177 to no longer remain perpendicular to the gravity vector 170 (e.g., first angle and/or the second angle are no longer generally equal to a predetermined angle, such as for example, 90-degrees), this condition corresponds to the headrest 110 no longer being in a position to provide an optimal listening experience for the occupant. Similarly, in the event the headrest 110 tilts or rotates causing the second axis 172 and/or the third axis 177 to be perpendicular to the gravity vector 170 (e.g., the first angle and/or the second angle are generally equal to the predetermined angle (e.g., 90-degrees in addition to some tolerance), then this condition corresponds to the headrest 110 being in a position to provide an optimal listening experience for the occupant.

As noted above, the sensor 212 may be an accelerometer and is configured to measure the static angle (or first angle or tilt angle) on between the second axis 172 and the gravity vector 170 (or relative to gravity) which serves as a reference axis. If such a measurement (e.g., the tilt angle) indicates that the first angle or the second angle is no longer 90-degrees, then this condition indicates that the headrest 110 is not in a position to provide an optimal listening experience for the occupant. If the sensor 212 provides an output that indicates that the first angle or the second angle is generally 90-degrees (e.g., an angle that is 90 degrees+/−a predetermined tolerance value), then this condition indicates that the headrest 110 is in a position to provide an optimal listening experience for the occupant.

Stated differently, the accelerometer measures the tilt (or tilt angle) of the headrest 110 relative to the gravity vector 170. During a configuration or tuning phase, engineers may program the accelerometer to define gravity as a vector (or axis) as the gravity vector 170 when the headrest 110 is fixed to the seat 104, 106 and when the headrest 110 is positioned in the location that provides the optimal listening experience. The gravity vector 170 serves as a reference axis. In this case, as the headrest 110 tilts or rotates, the accelerometer provides an output indicative of the tilt or rotation of the headrest 110 relative to the gravity vector 170. Thus, when the first angle (or second angle) between the second axis 172 and the gravity vector 170 (or between the third axis 177 and the gravity vector 170) is either less than or greater than 90 degrees, this condition is generally indicative of the headrest 110 not being at a location that provides an optimal listening experience. When the first angle (or the second angle) is generally equal to 90 degrees (while taking into account a +/−predetermined tolerance value), this condition corresponds to the location of the headrest 110 being in a location that yields the optimal listening experience for the occupant.

Figure 3:
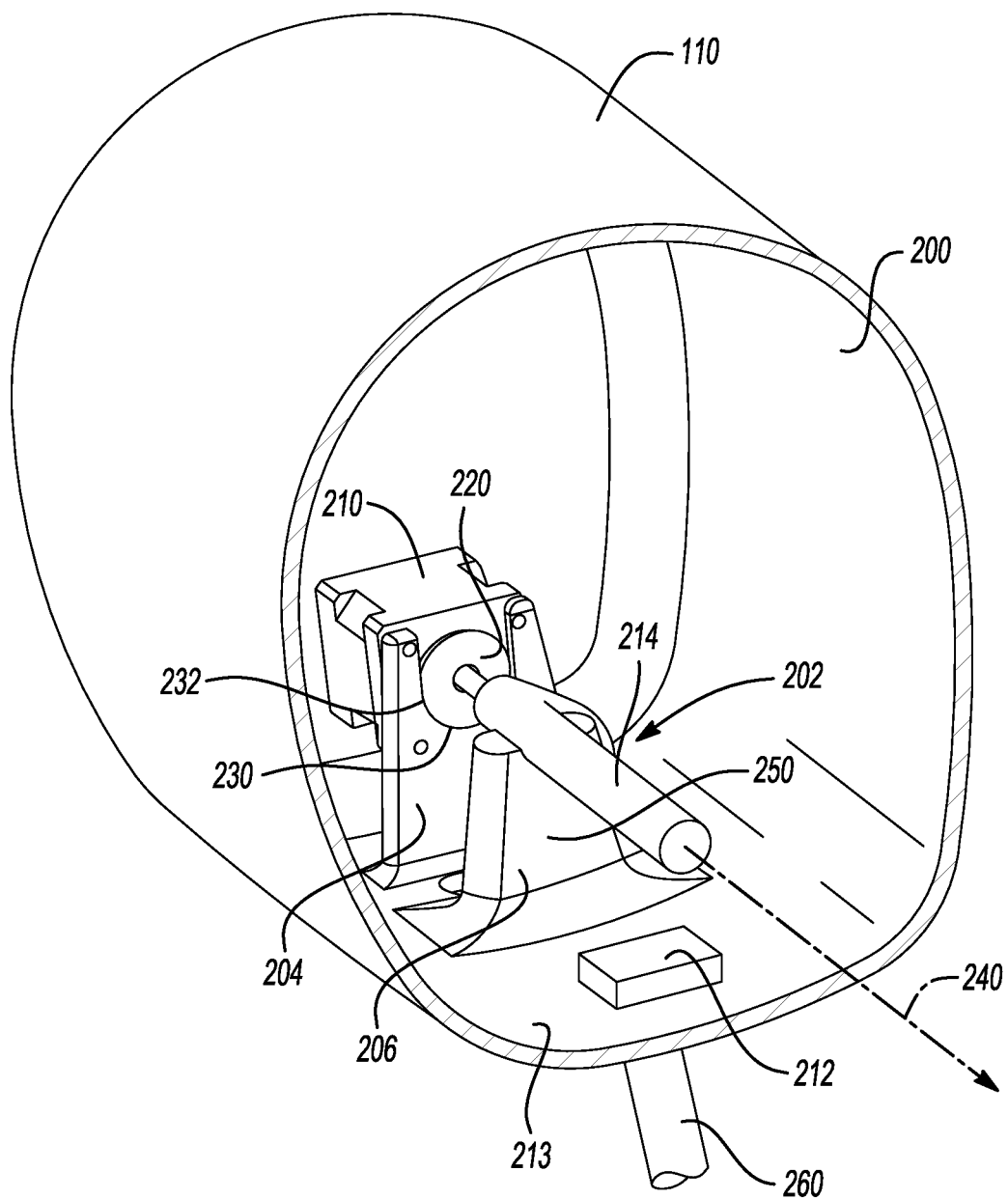
FIG. 3 depicts a detailed view of a headrest positioned on the seat in accordance with one embodiment.

FIG. 3 depicts a detailed view of the headrest 110 in accordance with one embodiment. As shown, the headrest 110 defines an inner chamber 200. A mounting bracket 202 is positioned within the inner chamber 200. The mounting bracket 202 includes a first portion 204 and a second portion 206. A motor (e.g., stepper motor) 210 is attached to the first portion 204 of the mounting bracket 202. The sensor 212 is positioned on a floor 213 of the inner chamber 200 of the headrest 110. It is recognized that the sensor 212 may be positioned anywhere within the headrest 110. As noted above, the sensor 212 measures the static angle (e.g., the first angle or the second angle) relative to the gravity vector 170 to indicate whether the headrest 110 is in a position that provides an optimal listening experience with respect to the loudspeakers 120. The sensor 212 reports information corresponding to the first angle or the second angle to the seat controller 208.

A rod 214 is attached to the motor 210. The motor 210 rotates the rod 214 in response to receiving a control signal from a switch (not shown) that is actuated by the occupant to move the headrest 110. In one example, the switch may be positioned proximate to the seat 104, 106 (e.g., cither directly or indirectly on the seat 104, 106). It is also recognized that the position of the headrest 110 may be moved manually by the occupant. In this regard, the sensor 212 may continue to provide a measurement with respect to the first angle or the second angle relative to the seat controller 208. The In another example, the user interface 132 may transmit a control signal to the seat controller 208 to control the motor 210 to move the headrest 110 to a predetermined location (e.g., position of the headrest 110 where the first angle or the second angle is generally 90 degrees) to provide the optimal listening experience.

A first gear 220 is positioned on the rod 214 and is rotatably received by the first portion 204 of the mounting bracket 202. For example, the first portion 204 of the mounting bracket 202 includes a first recess 230 having a plurality of gear teeth 232 to engage the gear teeth of the first gear 220. Therefore, when the occupant actuates the switch to move the headrest 110, the teeth and the first gear 220 engage the plurality of gear teeth 232 to allow the headrest to rotate or pivot in either a clockwise or counterclockwise direction about a longitudinal axis 240. The longitudinal axis 240 extends outwardly from the rod 214. The second portion 206 of the mounting bracket 202 defines a second recess 250 for receiving the rod 214. The second recess 250 is defined by a radius to enable the rod 214 to rotate thereon.

The second portion 206 of the mounting bracket 202 includes a cavity defined on an underside therein (not shown). A support rod 260 supports the headrest 110 relative to the seatback 112. As the headrest 110 tilts or moves in the manner described above, the headrest 110 also moves relative to the support rod 260 within the cavity formed by the underside of the second portion 206. The cavity formed on the underside of the second portion 206 of the mounting bracket 202 defines the overall length/arc of travel for the headrest 110. The support rod 260 is attached to the second portion 206 of the mounting bracket 202 and remains fixed thereto.

Further in reference to FIGS. 2 and 3, the occupant may also select via one or more prompts or selections on the user interface 132 to move their respective headrest 110 to the location that provides the optimal listening experience. The user interface 132 provides a control signal to the seat controller 208 which is indicative of a command to move their headrest 110 to the location that provides the optimal listening experience. The user interface 132 transmits a signal over the communication bus to the seat controller 208 to automatically move the headrest 110 to the location that provides the optimal listening position for the occupant. In this regard, the seat controller 208 may control the motor 210 to move the rod 214 to align the headrest 110 to the location that provides the optimal listening experience.

Figure 4:
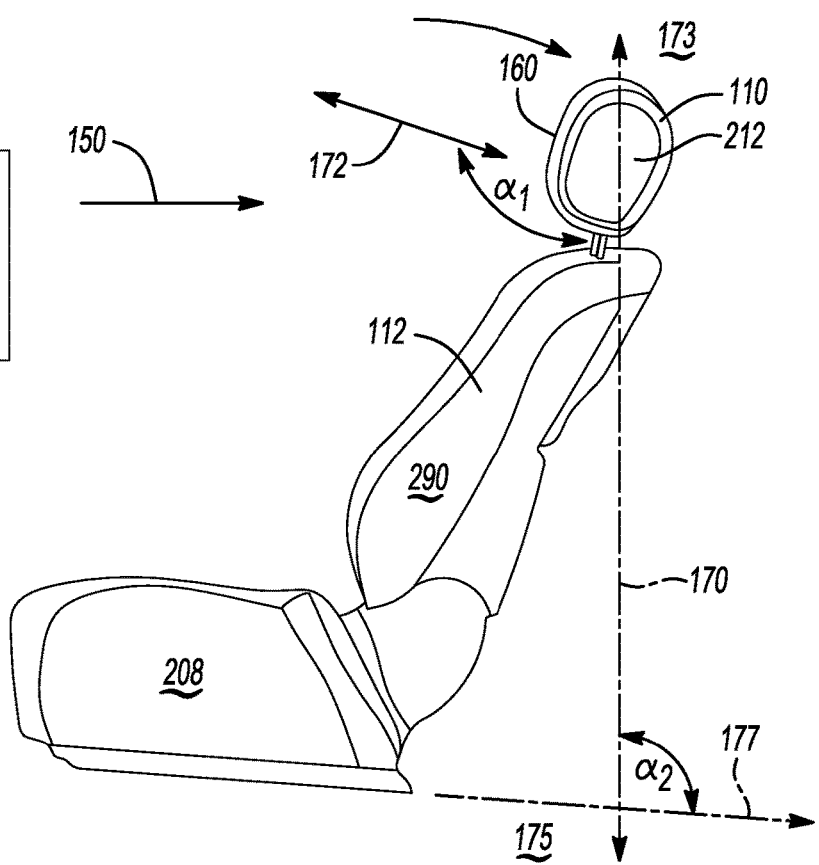
FIG. 4 depicts another side view of the seat relative to the speaker arrangement in the vehicle in accordance with one embodiment.
Figure 4:
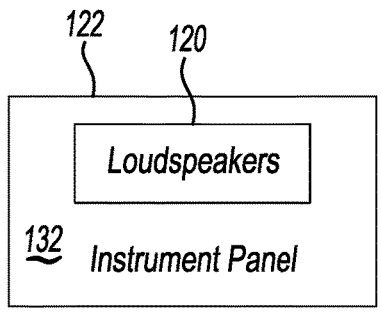

FIG. 4 depicts another side view of the seat 104, 106 relative to the speaker arrangement 100 in the vehicle 102 in accordance with one embodiment. As noted above in connection with FIG. 2, the loudspeakers 120 transmit audio (or the sound beam) along the first axis 150 that extends longitudinally across the vehicle 102 to the driver in the seat 104 and/or the passenger in the seat 106. The headrest 110 generally provides the front face 160 that is orientated toward the sound beam that extends along the first axis 150.

As shown in FIG. 4, the seatback 112 is reclined in the aft direction compared when compared to the position of the seatback 112 as shown in FIG. 2. In this regard, the headrest 110 may not be parallel with the sound beam that is transmitted along the first axis 150 relative to the second axis 172 (or that the first axis 150 is not on the same plane of the second axis 172). Thus, the position of the seatback 112 and ultimately the headrest 110 may not be in a location that yields the optimal listening experience. However, in this regard, the system 100 allows the occupant to position the seat 104, 106 in order to meet the occupants desired comfort level. Given that the front face 160 of the headrest 110 may not be parallel with the sound beam that is transmitted along the first axis 150, the occupant may select via user prompts on the user interface 132 to position or move the headrest 110 to a location that provides the optimal listening position based on the angle or location of the seatback 112.

Figure 5:
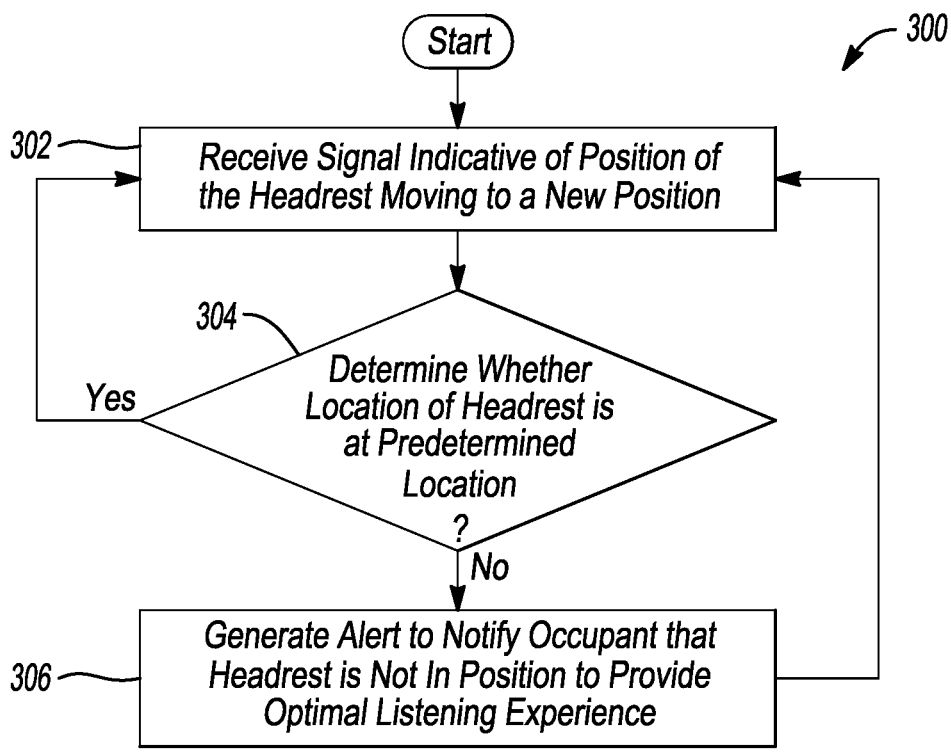
FIG. 5 depicts a method for notifying an occupant about a location of the headrest in the vehicle in accordance with one embodiment.

FIG. 5 depicts a method 300 or notifying an occupant about a location of the headrest 110 in the vehicle in accordance with one embodiment.

In operation 302, the seat controller 208 receives a signal that indicates the position of the headrest 110 from the sensor 212 (e.g., information corresponding to the first angle between the second axis 172 and the gravity vector 170 or information corresponding to the second angle between the third axis 177 and the gravity vector 170).

In operation 304, the seat controller 208 determines whether the location of the headrest 110 corresponds to the predetermined location that enables the occupant to experience the optimal listening experience. In this case, when the first angle or the second angle is generally 90 degrees, then this condition indicates that the headrest 110 is positioned in the predetermined location that enables the occupant to experience the optimal listening experience. In this case, the method 300 moves back to operation 302. If the seat controller 208 determines that the first angle or the second angle is not equal to 90 degrees, then this condition indicates that the headrest is not positioned in the predetermined location that enables the occupant to experience the optimal listening experience. In this case, the method 300 moves to operation 306.

In operation 306, the seat controller 208 transmits a signal to the user interface 132 such that the user interface 132 generates a visual and/or audio-based alert to the occupant to indicate that the position of the headrest 110 may not be in a position that enables the occupant to experience the audio optimally.

Figure 6:
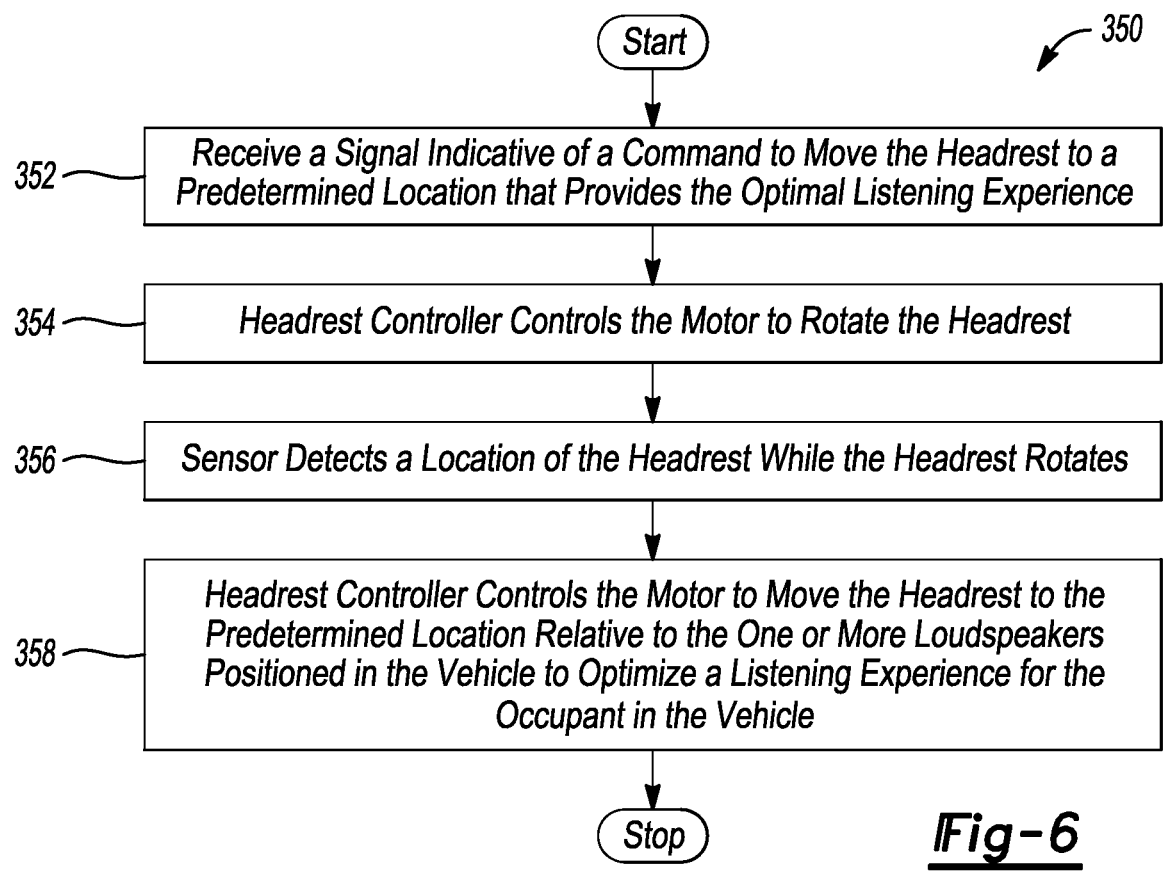
FIG. 6 depicts a method for controlling the headrest to move to a location that provides an optimal listening experience in accordance with one embodiment.

FIG. 6 depicts a method 350 for controlling the headrest 110 to move to a predetermined location that provides an optimal listening experience in accordance with one embodiment.

In operation 352, the seat controller 208 receives a signal from the user interface 132 that is indicative of a command to move the headrest 110 to the predetermined location that provides the optimal listening experience. While the user interface 132 may be positioned in the instrument panel 122, it is recognized that the user interface 132 may be positioned in any number of areas of the vehicle 102. Similarly, the user interface 132 may be implemented in a mobile device (not shown) that is wirelessly coupled to the vehicle 102. In this case, the user interface 132 may wirelessly transmit the command to the vehicle, where vehicle controllers (not shown) may transmit the command to the seat controller 208 via the data communication bus.

In operation 354, the seat controller 208 controls the motor 210 to rotate the headrest 110 to the predetermined location. In this case, the seat controller 208 controls the motor 210 to rotate the headrest 110 such that the first angle (or tilt angle) formed between the second axis 172 and the gravity vector 170 is generally 90 degrees or such that the second angle formed between the third axis 177 and the gravity vector 170 is generally 90 degrees.

In operation 356, the sensor 212 (or at least one sensor) measures the inclination or tilt of the headrest 110 relative to the gravity vector 170 (e.g., measures the first angle or the second angle) while the headrest 110 rotates.

In operation 358, in response to the sensor 212 providing a signal that the headrest 110 is at the predetermined location (or the tilt angle is equal to the predetermined angle of, for example, 90 degrees+/−a tolerance value), the seat controller 208 stops controlling the motor 210. In this instance, the headrest 110 is positioned at the predetermined location relative to the loudspeakers 120 to optimize the listening experience for the occupant in the vehicle 102. In this case, the second axis 172 that extends from the headrest 110 is positioned on the same plane as the sound emitted on the first axis 150.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controller(s) as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices (e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seatback configured for receiving an occupant in a vehicle;
   a headrest coupled to the seatback;
   a motor for rotating the headrest relative to one or more loudspeakers positioned in the vehicle outside of the headrest;
   at least one sensor configured to detect a location of the headrest; and
   at least one controller being programmed to:
   control the motor to move the headrest to a predetermined location relative to the one or more loudspeakers positioned in the vehicle to optimize a listening experience for the occupant in the vehicle.

2. The seat assembly of claim 1, wherein the at least one sensor includes at least one accelerometer.

3. The seat assembly of claim 2, wherein the at least one accelerometer is configured transmit a first output signal indicative of a tilt angle of the headrest relative to a first axis that extends from a front face of the headrest and a gravity vector that extends downward within the vehicle and from the headrest to a floor of the vehicle.

4. The seat assembly of claim 3, wherein the at least one controller is further programmed to receive the first output signal.

5. The seat assembly of claim 4, wherein the at least one controller is further programmed to determine that the headrest has not reached the predetermined location in response to the tilt angle not being equal to a predetermined angle.

6. The seat assembly of claim 5, wherein the at least one controller is further programmed to determine that the headrest has reached the predetermined location in response to the tilt angle being equal to a predetermined angle.

7. The seat assembly of claim 2, wherein the at least one accelerometer is positioned in the headrest.

8. The seat assembly of claim 1, wherein the at least one controller is further programmed to receive a command from a user interface indicative of a request to move the headrest to the predetermined location relative to the one or more loudspeakers positioned in the vehicle to optimize the listening experience for the occupant in the vehicle.

9. The seat assembly of claim 8, wherein the at least one controller is further programmed to receive the command from the user interface prior to controlling the motor to move the headrest to the predetermined location.

10. A method for moving a headrest in a vehicle, the method comprising:
    providing the seat assembly of claim 1;
    moving, via the motor, the headrest to orient an occupant's head relative to the one or more loudspeakers positioned in the vehicle;
    detecting the location of the headrest; and
    controlling the motor, via the at least one controller, to move the headrest to the predetermined location relative to the one or more loudspeakers positioned in the vehicle to optimize the listening experience for the occupant in the vehicle.

11. The method of claim 10, further comprising receiving a command from a user interface indicative of a request to move the headrest to the predetermined location relative to the one or more loudspeakers positioned in the vehicle to optimize the listening experience for the occupant in the vehicle.

12. A seat assembly comprising:
    a seat for receiving an occupant in a vehicle;
    a headrest for being attached to the seat and including a motor for rotating the headrest to orient an occupant's head relative to one or more loudspeakers positioned in the vehicle;
    at least one sensor configured to detect a location of the headrest, wherein the at least one sensor includes at least one accelerometer configured to transmit a first output signal indicative of a tilt angle of the headrest relative to a first axis that extends from a front face of the headrest and a gravity vector that extends downward within the vehicle and from the headrest to a floor of the vehicle; and
    at least one controller being programmed to:
    control the motor to move the headrest to a predetermined location relative to the one or more loudspeakers positioned in the vehicle to optimize a listening experience for the occupant in the vehicle.

13. The seat assembly of claim 12, wherein the at least one controller is further programmed to receive the first output signal.

14. The seat assembly of claim 13, wherein the at least one controller is further programmed to determine that the headrest has not reached the predetermined location in response to the tilt angle not being equal to a predetermined angle.

15. The seat assembly of claim 14, wherein the at least one controller is further programmed to determine that the headrest has reached the predetermined location in response to the tilt angle being equal to a predetermined angle.

16. The seat assembly of claim 12, wherein the at least one accelerometer is positioned in the headrest.

17. The seat assembly of claim 12, wherein the at least one controller is further programmed to receive a command from a user interface indicative of a request to move the headrest to the predetermined location relative to the one or more loudspeakers positioned in the vehicle to optimize the listening experience for the occupant in the vehicle.

18. The seat assembly of claim 17, wherein the at least one controller is further programmed to receive the command from the user interface prior to controlling the motor to move the headrest to the predetermined location.

* * * * *